(12) United States Patent
Trammell

(10) Patent No.: US 8,104,613 B2
(45) Date of Patent: Jan. 31, 2012

(54) DISC HOLDER AND CASE ENCLOSURE

(76) Inventor: T. Richard Trammell, Gaffney, SC (US)

( * ) Notice: Subject to any disclaimer, the term of this patent is extended or adjusted under 35 U.S.C. 154(b) by 0 days.

(21) Appl. No.: 12/772,327

(22) Filed: May 3, 2010

(65) Prior Publication Data

US 2011/0266175 A1    Nov. 3, 2011

(51) Int. Cl.
B65D 85/02 (2006.01)
A45F 5/00 (2006.01)

(52) U.S. Cl. ........ 206/310; 206/303; 206/445; 206/493; 211/49.1; 211/59.1; 294/158

(58) Field of Classification Search .................. 206/303, 206/308.1–310, 445, 493; 211/40, 41.12, 211/49.1, 59.1; 294/158
See application file for complete search history.

(56) References Cited

U.S. PATENT DOCUMENTS

| | | | | |
|---|---|---|---|---|
| 1,504,421 A * | 8/1924 | Bishop | ......................... | 211/49.1 |
| 2,030,465 A * | 2/1936 | Nist | ............................... | 206/303 |
| 2,341,635 A * | 2/1944 | Loesch | ........................ | 211/59.1 |
| 3,955,733 A * | 5/1976 | Russell | ......................... | 206/310 |
| 4,700,839 A * | 10/1987 | Fujii | ........................... | 206/308.3 |
| 5,366,079 A * | 11/1994 | Lin et al. | ....................... | 206/303 |
| 5,392,913 A | 2/1995 | Merrick | | |
| 5,547,078 A | 8/1996 | Iida | | |
| 5,553,711 A * | 9/1996 | Lin et al. | ....................... | 206/303 |
| 5,590,770 A | 1/1997 | Yeh | | |
| 5,611,448 A * | 3/1997 | Chen | ............................ | 206/445 |
| 5,924,564 A | 7/1999 | Lin | | |
| 6,230,904 B1 * | 5/2001 | Licari | ........................ | 294/158 |
| 6,789,668 B2 * | 9/2004 | Kuo | ............................. | 206/310 |
| 6,820,741 B2 * | 11/2004 | Ferguson et al. | ............. | 206/310 |
| 7,121,405 B2 * | 10/2006 | Ito et al. | ..................... | 206/308.1 |
| 7,380,656 B2 * | 6/2008 | Yeh | .............................. | 206/303 |
| 7,775,352 B2 * | 8/2010 | Alvarez et al. | ................ | 206/310 |
| 2003/0098251 A1 * | 5/2003 | Yang | ............................. | 206/303 |

* cited by examiner

Primary Examiner — Bryon Gehman
(74) Attorney, Agent, or Firm — Jerry D. Haynes; Law Office of Jerry D. Haynes

(57) ABSTRACT

The present invention relates to a disc holder for storing a plurality of discs comprising: a base; a spindle extending vertically from the base, where the spindle enables the stacking of the plurality of discs; a top cover, where the top cover locks to the base by using two sliding clasps, where one clasp is one side of the top cover and the other clasp is on the opposite side. The base may include three prongs extending vertically from three respective sides of the base in order to keep discs aligned. The enclosure may further include a receptacle for the top of the spindle and a swivel handle for carrying the unit. The plurality of discs may include compact discs and DVDs or a combination of both.

6 Claims, 3 Drawing Sheets

DISC HOLDER AND CASE ENCLOSURE

BACKGROUND OF THE INVENTION

1. Field of Invention

The present invention relates to a disc storage apparatus that conveniently and safely stores multiple discs.

2. Description of Related Art

Compact discs and DVDs are thin flat discs that are used for the storage of audio and video media as played back on players or computers. The discs have a readable side and an opposite side for print media. The discs are usually sold in jewel boxes specially designed to hold and contain the compact disc or DVD. Various storage containers and storage devices have been developed since the introduction of CD's and DVD's into the marketplace.

Some examples of prior art CD storage devices include U.S. Pat. No. 5,392,913 which discloses a storage holder for computer discs, CD's, records, tapes cassettes and the like in the form of a single unitary piece of molded plastic where the holder includes a rectangular main body. U.S. Pat. No. 5,590,770 discloses a CD bank that includes a case, a transparent cover hinged to the case, and a plurality of individual CD holder plates inside the case to hold individual compact discs where the case has two longitudinal rails bilaterally disposed on the inside.

Another example of a CD storage device is disclosed in U.S. Pat. No. 5,547,078 which discloses a holder accommodating at least one disc shaped recording media such as a optical disc includes at least one holder having means for holding a recording medium. The housing is made up of a plurality of holders for holding the disc where the holders are arranged closely adjacent one another in parallel relationship. U.S. Pat. No. 5,924,564 discloses a disc storage device adapted for holding a disc having a center spindle hole, the disc storage device including a disc holder plate and a spring element fastened to the disc holder plate. The use of compact discs and DVD's is still quite popular and therefore further development of storage devices is readily needed to address the needs of many consumers.

SUMMARY OF THE INVENTION

The present invention relates to a disc holder for storing a plurality of discs comprising: a base; a spindle extending vertically from the base, where said spindle enables the stacking of the plurality of discs; a top cover which slides over discs to connect to the base and is locked into place by two sliding clasp locks to secure case, where one lock is on one side and the other on the opposite side; and the base which will house the spindle in the middle extending upward with the stack of discs. The base may include a round groove cut out in the middle extending upward. The base includes three prongs extending upward from three respective sides which will keep the discs aligned. An enclosure for the disc holder may include a receptacle for the top of the spindle and a swivel handle for the enclosure. The plurality of discs may include compact discs, DVD's or a combination of the two.

DETAILED DESCRIPTION

The present invention relates to a disc holder and container that provides the means to store a plurality of CD or DVD discs. The present invention utilizes a spindle to stack the discs while the disc is inserted in a paper sleeve for protection. As the discs are stacked, a holder is placed on top of the top disc in order to hold the discs in a stable position while stacked on the spindle. The stacked discs may be inserted into a holding case for storage and then removed as needed for retrieval.

Figure 1:
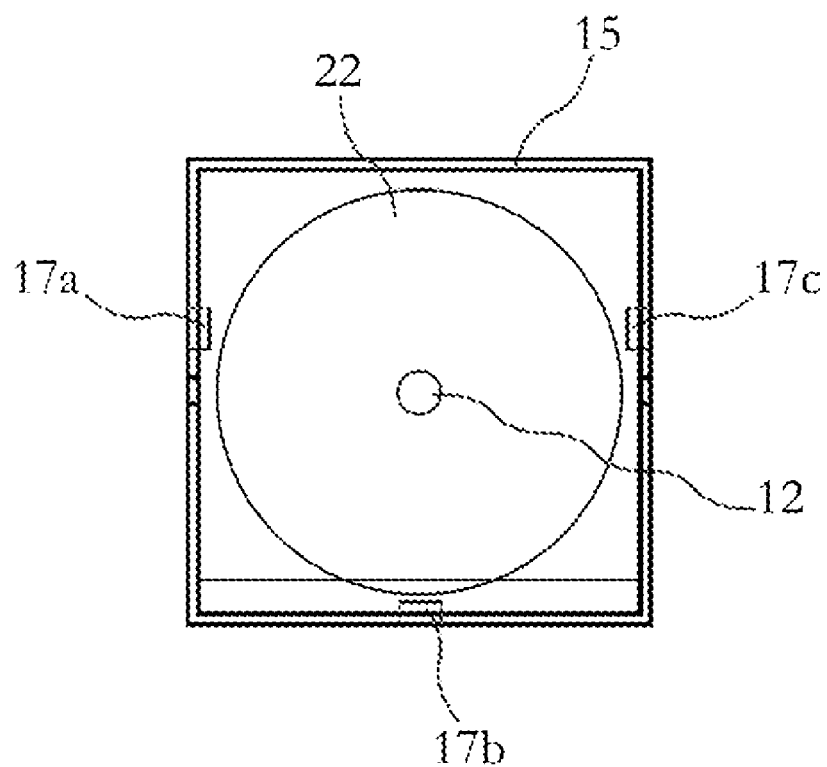
FIG. 1 depicts a top view of the disc storage device according to the present invention.

FIG. 1 depicts a top view of the disc holder device according to the present invention. The top view provides a clear view of a top cover 14. The top cover 14 is placed over the top of the discs onto the spindle base 15. The base 15 includes three prongs 17a, 17b, 17c that extend vertically up from three respective sides of the base 15. The prongs 17a-c keep the stack in a stable position as discs are added to a spindle 12. The spindle 12 provides the means for the insertion of the center opening of a disc onto the spindle 12 for storage. Each disc may be stored in a paper sleeve that includes an opening to accommodate the center hole of the disc to allow for the insertion of the disc and paper sleeve onto the spindle 12. The paper sleeve may not have the plastic liner which is in the middle of the paper sleeve.

Figure 2A:
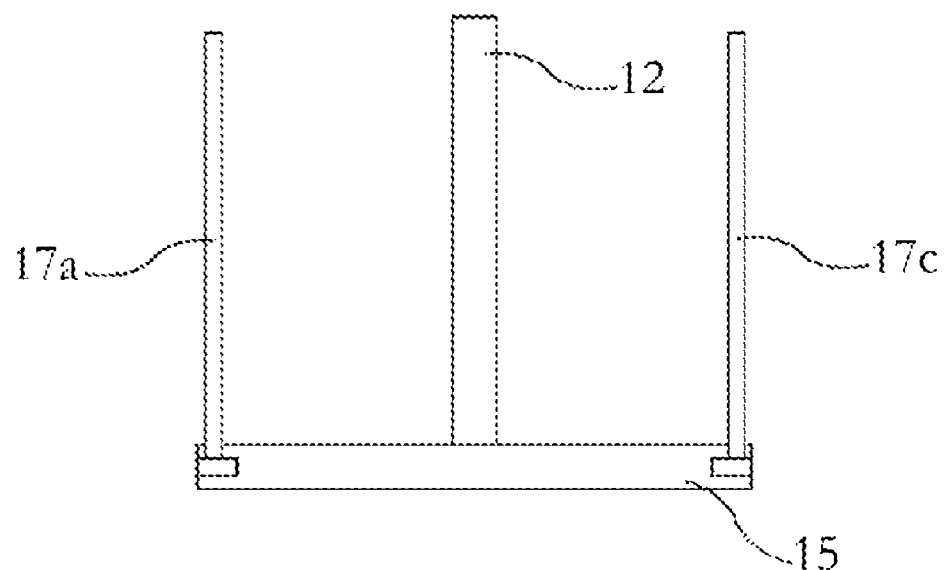
FIG. 2A depicts a side view of the disc storage device according to the present invention.

A top disc 22 is depicted in FIG. 1 that is enclosed in a paper sleeve for storage. The paper sleeve not shown provides the means to protect the discs from scratches or other damages that may occur while being handled onto and off of the spindle 12. A side view of the storage device according to the present invention is depicted in FIG. 2A where the spindle 12 is shown to extend vertically from the bottom base 15. The spindle 12 provides the means for the insertion of a plurality of discs. The top 14 is removed to allow for the insertion of discs onto the spindle 12. Once the discs are placed upon the spindle 12, the top 14 is placed back on the storage device and therefore provides the means for stabilizing the stack of discs on the spindle 12.

Figure 2B:
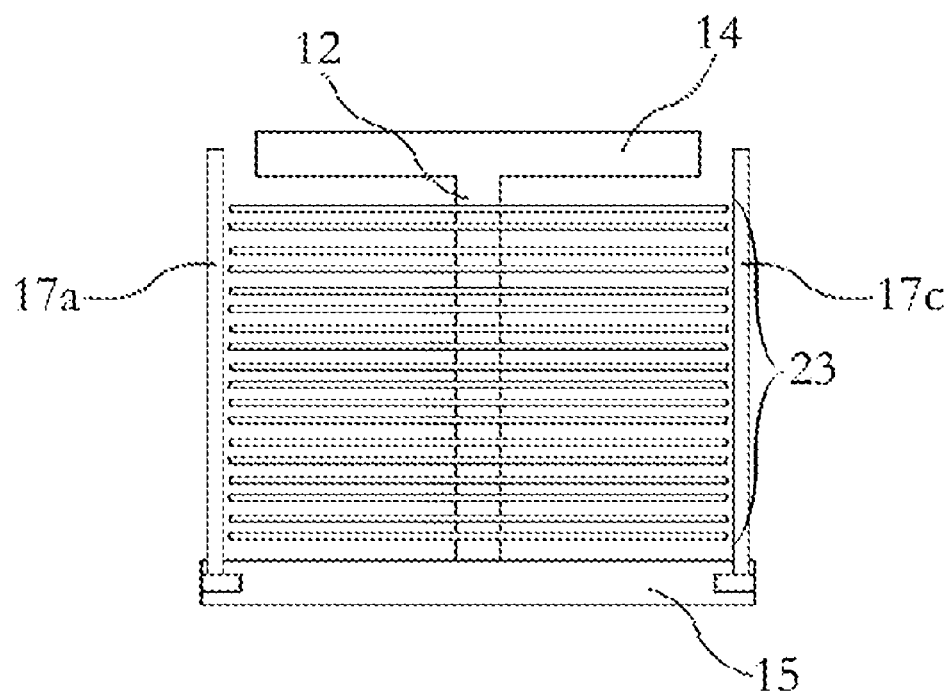
FIG. 2B depicts a side view of the disc storage device of the present invention with a plurality of discs stacked on the spindle.
Figure 3:
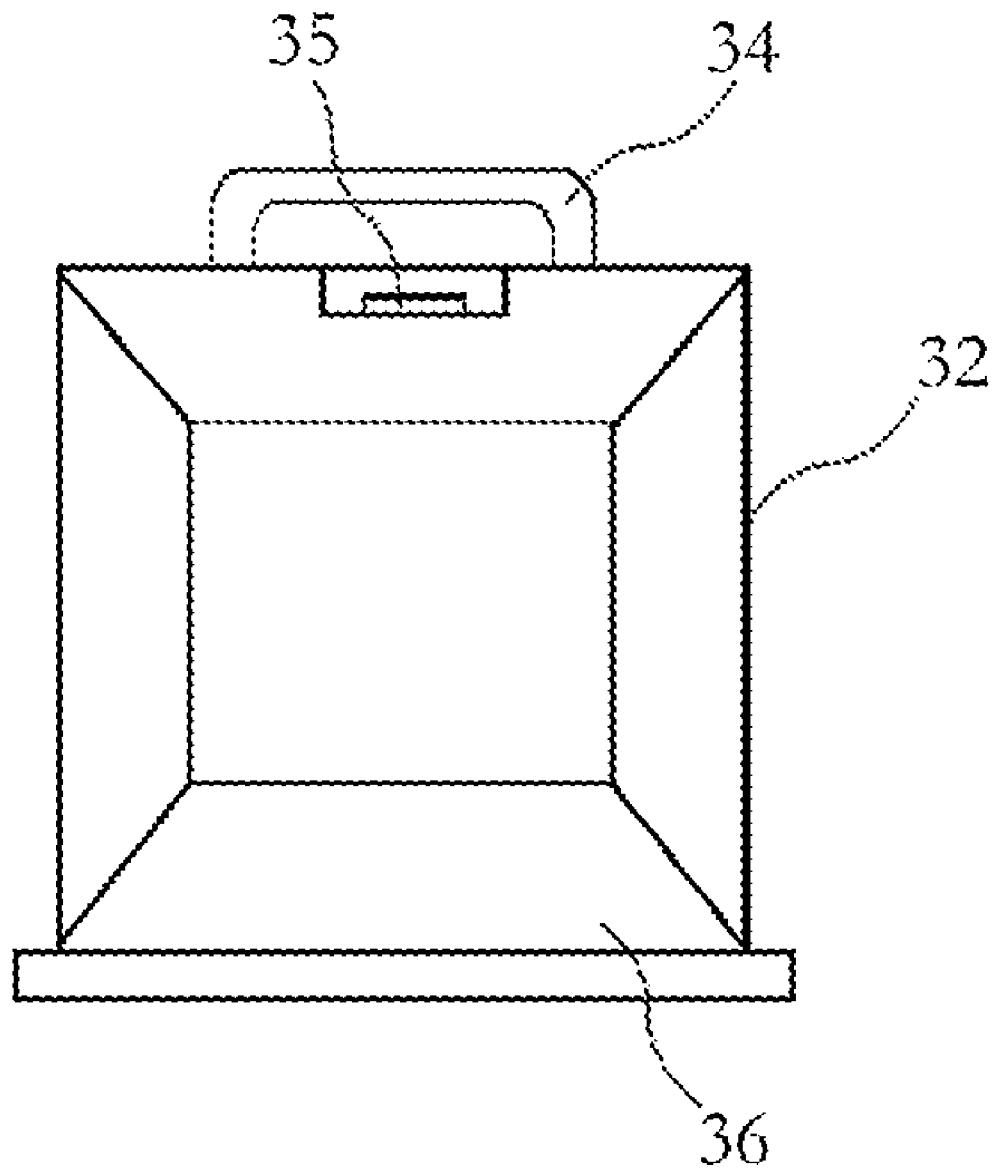
FIG. 3 depicts a case enclosure according to the present invention.

FIG. 2B depicts the spindle 12 with a number of discs stacked below the top cover 14. As shown the top cover 14 is placed on top of the stack of discs and the base 15 is shown at the bottom of spindle 12 that provides the support for the stack of discs 23. This configuration may be stored in a case 32 as shown in FIG. 3. The case 32 includes a swivel handle and a spindle receiver 35 at the top of the case. A base 36 is provided at the bottom of the case 32. The case 32 is substantially a cuboid and provides the means for the insertion of a stack of discs 23 within the case 32. This case 32 allows for the insertion of the spindle 12 into the spindle holder 35 at the top of the case 32 and the base 15 rests upon the base of the case 36.

This disc holder provides a convenient and easy means for the storage of multiple discs in a compact area. Further the storage is simplified and does not require an additional container or jewel box for the disc. The stacking of discs within the paper sleeve allows for more efficient use of space in the storage case 32 and thus allows for more discs as opposed to the use of a disc within a conventional jewel box.

What is claimed is:

1. A disc holder for storing a plurality of stacked discs comprising:

a. a base comprising plural peripheral sides and three prongs extending vertically from the base, where each prong extends from a respective side of the base to maintain the position of the plurality of stacked discs;

b. a spindle extending vertically from a central portion of the base, where the spindle enables the stacking of the plurality of discs;

c. a top cover, where the top cover is positioned above the spindle, the prongs and the base to provide support for the plurality of stocked discs; and d. a case enclosure, where the case enclosure receives the base, the spindle, the prongs and the top cover therein for storage in an assembled configuration.

2. The disc holder according to claim 1, where the spindle and the base enable the plurality of discs to include both compact discs and DVDs.

3. The disc holder according to claim 1, where the case enclosure is a cuboid.

4. The disc holder according to claim 3, wherein the case enclosure includes a handle.

5. The disc holder according to claim 4, wherein the handle is a swivel handle.

6. The disc holder according to claim 3, wherein the case enclosure includes a spindle receiver at a top of the case enclosure, where the spindle receiver enables insertion of the spindle into the top of the case enclosure.

* * * * *